Jan. 16, 1945.  A. B. NEWTON  2,367,305
REFRIGERATING SYSTEM
Filed Nov. 30, 1940  2 Sheets-Sheet 1

INVENTOR
Alwin B. Newton
BY George H. Fisher
ATTORNEY

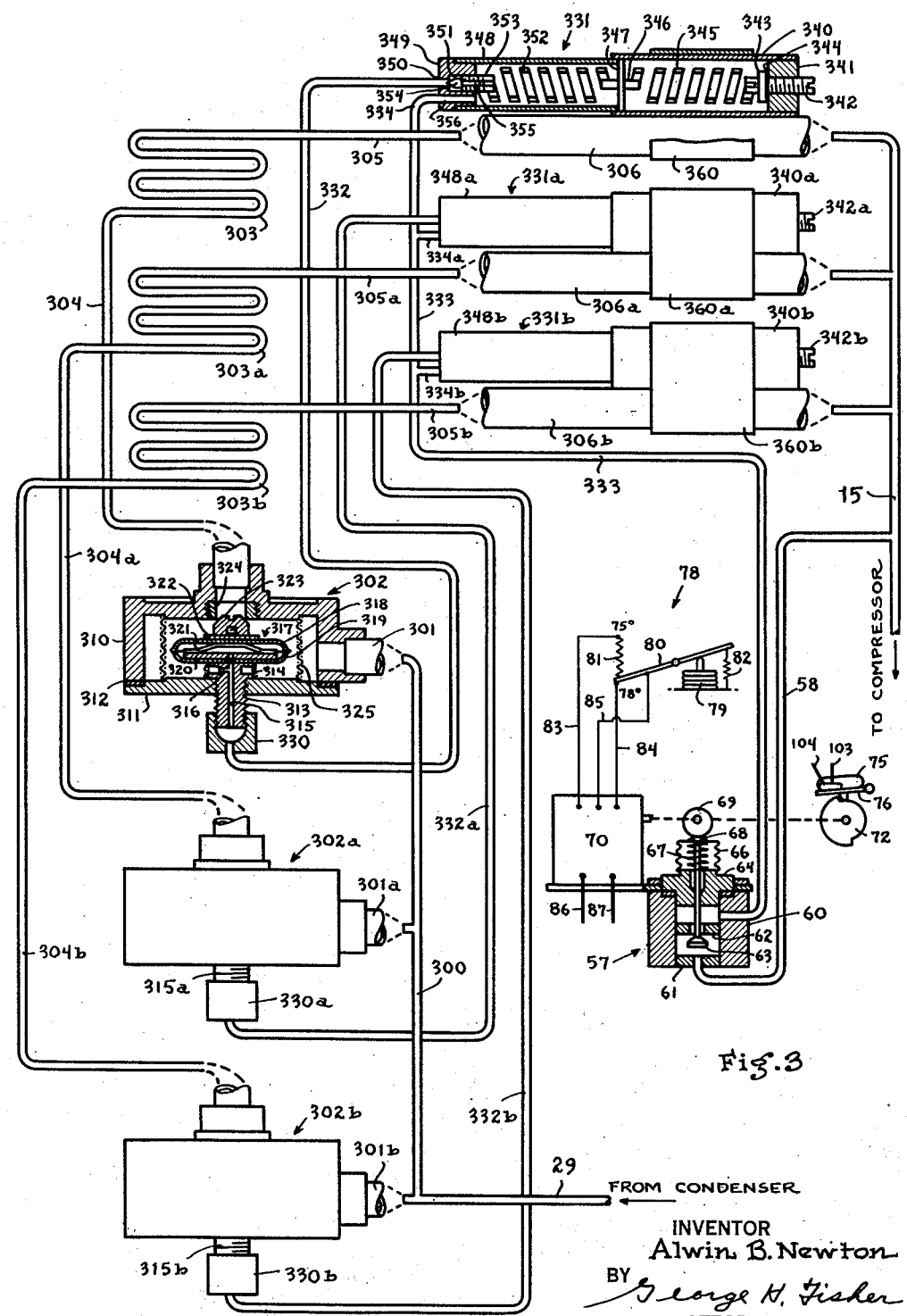

Patented Jan. 16, 1945

2,367,305

UNITED STATES PATENT OFFICE 2,367,305

REFRIGERATING SYSTEM

Alwin B. Newton, Minneapolis, Minn., assignor to Minneapolis-Honeywell Regulator Company, Minneapolis, Minn., a corporation of Delaware Application November 30, 1940, Serial No. 368,002

15 Claims. (Cl. 62—8)

This invention relates to refrigeration, particularly to compression type refrigerating systems. In many systems, especially those employed for air conditioning work multiple evaporators are used, and my invention deals with improvements in methods and means of controlling the refrigerating capacities of multiple evaporators, the invention providing a novel and efficient way of sequentially controlling the capacities of the various evaporators.

The invention disclosed herein is related to the refrigerating systems disclosed in my prior applications, Serial No. 243,843, filed December 3, 1938; Serial No. 286,594, filed July 26, 1939; and Serial No. 300,400, filed October 20, 1939. My prior applications show various arrangements for controlling the capacity of an evaporator by controlling the degree of superheat at the outlet thereof.

My present invention involves an arrangement of multiple evaporators wherein individual means are provided for maintaining a given degree of superheat in each evaporator. The said means are of the improved forms shown in my prior applications, and the present invention comprehends an arrangement providing a common control means for simultaneously varying the capacity of the various multiple evaporators by adjusting the degree of superheat maintained at the outlet of each. The refrigerating capacity of an evaporator varies very little with changes in superheat when the degree of superheat being maintained is relatively low, but the capacity drops off sharply with increases in superheat when a relatively higher degree of superheat is being maintained. Thus by maintaining relatively different degrees of superheat in multiple evaporators and simultaneously increasing the degree of superheat in all of them, the capacity of those operating at higher degrees of superheat will be reduced most. In this manner as the refrigerating load decreases the capacities of the multiple evaporators can be conveniently sequentially reduced until they have insubstantial refrigerating effect.

Accordingly, the object of my invention is to provide a system for sequentially controlling the capacities of multiple evaporators by normally maintaining different degrees of superheat at their outlets and simultaneously varying the superheat of all the evaporators.

Another object is to provide a system of multiple evaporators having individual pressure operated superheat control valves and common means for varying the pressure applied to all the valves for simultaneously varying the degree of superheat maintained by each valve.

Numerous other objects and advantages of my invention will become apparent from the following detailed description and annexed drawings wherein:

Figure 3 represents diagrammatically a refrigerating system embodying a modified form of my invention.

Figure 1:
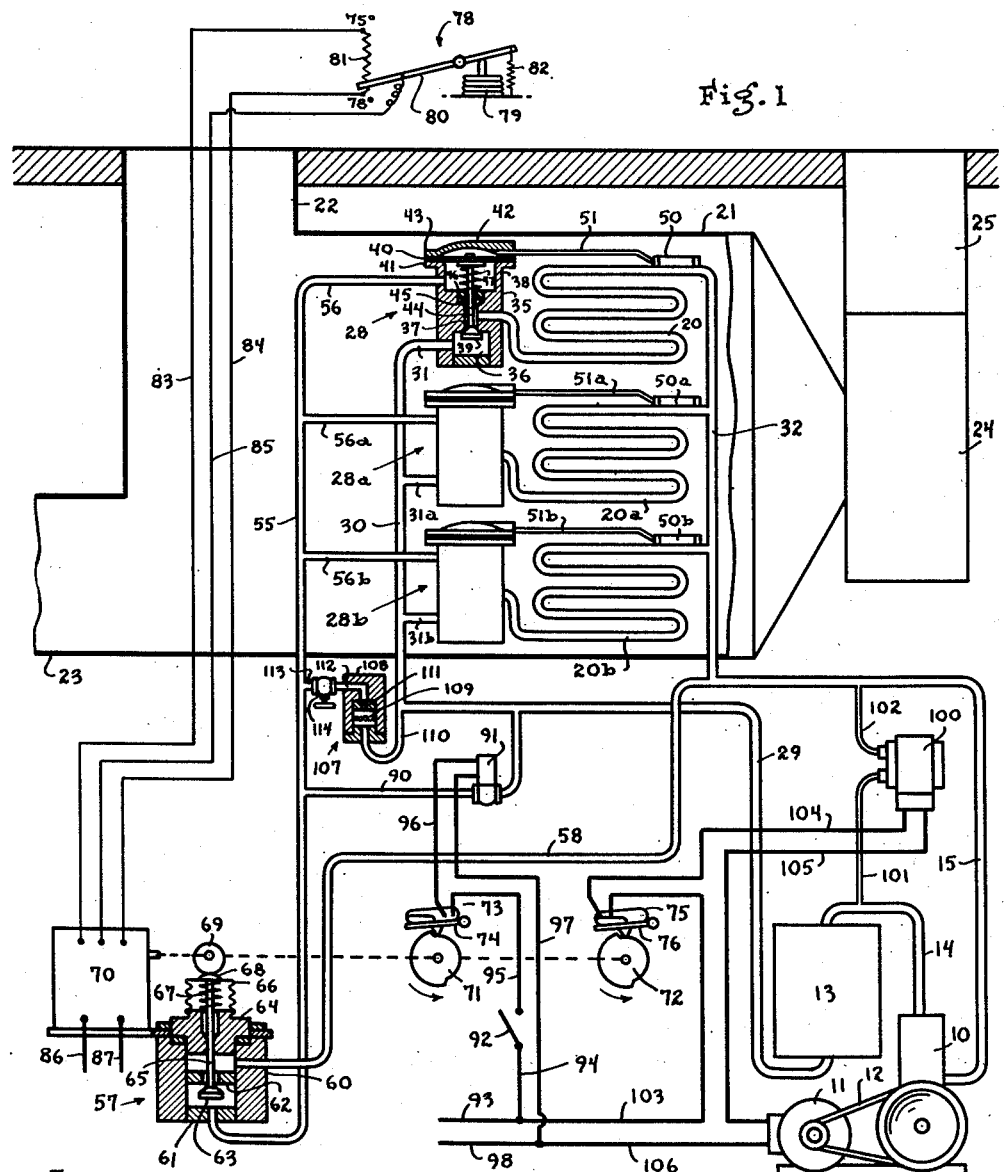
Figure 1 represents diagrammatically a refrigerating system embodying one form of my invention.

Referring to Figure 1 of the drawings, I have shown diagrammatically an air conditioning system including refrigeration apparatus of the compression type. The refrigerating apparatus comprises a compressor 10 driven by an electric motor 11 through a belt 12. The discharge of the compressor is connected to a condenser 13 by a pipe 14 and expanded refrigerant is returned to the suction side of the condenser through a pipe 15.

The refrigerating apparatus includes a plurality of evaporators designated 20, 20a and 20b, all of which are disposed in an air duct 21. The air duct 21 has a branch 22 through which air may be withdrawn from a room or space being conditioned, and a branch duct 23 through which fresh air from outdoors may enter. At its right end the duct 21 communicates with a motor driven fan 24 having a discharge duct 25 which discharges into the room or spaces being conditioned.

At the inlet of the evaporator 20 is an expansion valve 28 of the superheat control type and at the inlets of the evaporators 20a and 20b are corresponding expansion valves 28a and 28b, respectively.

The condenser 13 discharges into a pipe 29 which is connected to a pipe 30 having branch connections 31, 31a and 31b connected to the inlets of the respective expansion valves 28, 28a, and 28b. The evaporators 20, 20a and 20b are connected to a common outlet pipe 32 which is in turn connected to the pipe 15 leading to the suction side of the compressor.

The expansion valve 28 comprises a body 35 having an inlet chamber 36 and a longitudinal throat 37 connecting the inlet chamber 36 and a chamber 38 within the upper part of the valve body. The lower end of the throat 37 forms a seat for a valve head 39. The upper part of the valve body is closed and sealed by a diaphragm 40, the edges of which engage with a flange 41 at the upper part of the valve body, there being a valve cover 42 having a corresponding flange 43 which may be secured to the valve body in any suitable manner with the edges of the diaphragm between the flanges making the body of the valve fluid tight. The valve head 39 has a stem 44 connected thereto which extends through the throat 37, the end of the valve stem being suitably secured to the diaphragm 40. The upper end of the throat 37 is counterbored and contains suitable packing 45 around the valve stem, the packing being held in place by a metal ring 46 fitted in the counterbore. Interposed between the diaphragm 40 and the ring 46 is a coil spring 47 which normally urges the diaphragm in an upward direction to urge the valve head 39 towards its seat. It will be noted in Figure 1 that the branch pipe 31 is connected to the inlet chamber 36 and the inlet to the evaporator is connected to the throat 37 on the opposite side of the valve. The valve cover 42 is slightly bulged so as to form a chamber between it and the upper side of the diaphragm and this chamber is connected to a thermostatic bulb 50 by means of a tube 51. The bulb 50 is disposed in intimate thermal contact with the outlet of the evaporator 20. The bulb 50 and the tube 51 are filled with a volatile liquid which vaporizes and develops pressure in accordance with the temperature of the superheated refrigerant at the outlet of the evaporator 20. This pressure is communicated to the chamber on the upper side of the diaphragm 40 and normally acts to urge the valve head 39 away from its seat, that is in opening direction of the expansion valve 28. Normally there is a certain amount of leakage of refrigerant from the inlet side of the evaporator around the packing 45 to the chamber 38 so that if refrigerant is not permitted to escape from the chamber 38, pressure therein will build up to a value corresponding to that at the inlet of the evaporator.

The valves 28a and 28b are identical to the valve 28, these valves including similar temperature responsive bulbs.

Numeral 55 designates a pipe forming part of an equalizer connection having branch pipes 56, 56a and 56b connected to the chambers corresponding to the chamber 38 of the respective valves 28, 28a and 28b. The pipe 55 is connected to the inlet of a thermostatic control valve 57 and the outlet of the control valve 57 is connected by a pipe 58 to the juncture of the common outlet pipe 32 of the evaporators and the pipe 15 connected to the suction side of the compressor. As will be apparent the pipes 55 and 58 and the branch pipes 56 form equalizer connections between the chambers underneath the diaphragms of the expansion valves and the outlet side, that is the low pressure side, of the evaporators. Inasmuch as there is a certain pressure drop through the evaporators, when the equalizer connection is wide open, the pressure underneath the diaphragms of the respective expansion valves is lower than it would be if there were no equalizer connection or if it were closed and the under side of the diaphragms were subjected to pressure at the inlet of the evaporators bleeding into the chambers around the valve stems.

The control valve 57 comprises a casing 60, the lower end of which is closed by a closure member 61 having an opening therethrough to which the pipe 55 is connected. The casing 60 has an internal partition 62 having an opening therethrough which forms a valve seat for a valve head 63. The upper part of the casing 60 is closed by a closure member 64 and there is a stem 65 connected to the valve head 63 which extends through the closure member 64, its end being connected to an expansible and contractible bellows 66. The lower end of the bellows 66 is connected to the member 64 and a coil spring 67 within the bellows normally tends to expand it so as to urge the valve head 63 against its seat, that is towards closed position of the valve. The bellows 66 has a knob 68 on its movable end which is normally engaged by a cam 69 in the form of an eccentric disk. The cam 69 is mounted upon the shaft of a proportioning motor 70 of the type disclosed in detail in the patent of D. G. Taylor 2,028,110. Also mounted on the shaft of the proportioning motor 70 is a pair of cams 71 and 72, each of which has a dwell of slightly greater radius than the remaining portion of the cam, the dwells having an extent of approximately 180 degrees of the cam circumference. The cam 71 is arranged to actuate a mercury switch 73 carried on a pivoted arm 74 having a cam follower engaging the surface of cam 71. The cam 72 is arranged to actuate a mercury switch 75 carried on a pivoted arm 76 having a cam follower engaging the surface of cam 72. The mercury switch 73 cooperates in the control of the expansion valves as will presently be described and the mercury switch 75 controls the compressor motor as will also be described later.

The proportioning motor 70 is controlled by a proportioning controller 78 corresponding to the controller disclosed in detail in the Taylor patent referred to above. The controller 78 is disposed in the room or spaces to be cooled and comprises an expansible bellows 79 filled with a volatile liquid which vaporizes so as to expand and contract the bellows in accordance with the temperature surrounding it. The bellows carries a stem at its movable end which engages a pivoted arm 80, one end of which acts as a slider cooperating with an electric resistance 81. The opposite end of the arm 80 is connected to a coil spring 82 which normally urges the arm 80 in a clockwise direction. The ends of the resistance 81 are connected to the proportioning motor 70 by wires 83 and 84 and the slider 80 is connected to the proportioning motor 70 by a wire 85. Power is supplied to the proportioning motor 70 by wires 86 and 87. When the temperature in the room or spaces being cooled is above 78° the slider is in the position shown in the drawings, that is at the lower end of resistance 81. With the controller 78 in this position, the proportioning motor has operated the control valve 57 to a wide open position as shown on Figure 1 so that the equalizer connections provide unrestricted communication between the chambers underneath the diaphragms of the respective expansion valves and the common outlet of the evaporators. As the temperature affecting the controller 78 falls, the bellows 79 contracts causing the slider 80 to move upwardly over the resistance 81. This unbalances the circuits of the proportioning motor 70 and it operates in a direction to progressively rotate the cam 69 so as to permit the bellows 66 to expand moving the valve head 63 towards its seat, that is in closing direction of the valve 57. As the valve 57 moves towards closed position the equalizer connection is progressively closed. At a temperature of substantially 75° in the room or spaces being conditioned, the slider 80 is at the upper end of resistance 81 and the proportioning motor 70 has operated the valve 57 to fully closed position. The proportioning motor 70 rotates its shaft in a counter-clockwise direction as the temperature falls and when the proportioning motor has operated sufficiently to move the valve 57 to fully closed position the cams 71 and 72 have been rotated in a counter-clockwise direction until their dwells have tilted the arms 74 and 76 in a clockwise direction so as to open the mercury switch 75 and close the mercury switch 73, these switches normally being in the position shown. Upon rise in temperature affecting controller 78, proportioning motor 70 of course operates in the opposite direction, to open valve 57 and return the mercury switches to the position shown.

Numeral 90 designates a pipe connected between the pipe 29 and the pipe 55, the pipe 90 having interposed therein an electric control valve 91. When the valve 91 is open, it can be readily seen that high pressure refrigerant can be freely communicated from the condenser 13 through the pipe 29, the pipe 90 and the pipe 55 and its branch pipes to the chambers underneath the diaphragms of the various expansion valves. When the valve 91 is opened, high pressure refrigerant therefor enters the chambers underneath the diaphragms of all the expansion valves and immediately moves them to closed position. The valve 91 is controlled by the mercury switch 73. Numeral 92 designates a manual switch and whenever this manual switch is closed and the mercury switch 73 is closed, a circuit is completed for opening the valve 91 from a wire 93 to a wire 94, manual switch 92, wire 95, mercury switch 73, wire 96, valve 91 and wire 97 back to wire 98, the wires 93 and 98 being connected to any suitable source of external power, not shown.

The compressor motor is controlled primarily by a controller 100 which is identical with the controller disclosed in detail in the application of Albert L. Judson and Carl G. Kronmiller, Serial No. 196,447, filed March 17, 1938. Briefly referring to the controller 100, it includes pressure responsive elements responsive to discharge and suction pressure of the compressor, these elements being connected to the discharge pipe 14 and suction pipe 15 by tubes 101 and 102, respectively. The controller 100 embodies switching mechanism which normally energizes the compressor motor at a relatively high suction pressure and deenergizes it at a relatively low suction pressure. The switching mechanism may also be actuated by the element responsive to discharge pressure to shut down the compressor motor in the event of a relatively high discharge pressure. The electrical circuit by which the controller 100 controls the compressor motor includes the wire 93, the wire 103, the mercury switch 75, the wire 104, controller 100, wire 105, the compressor motor and wire 106 back to the wire 98. Inasmuch as the mercury switch 75 is included in the circuit just described it follows that whenever the mercury switch 75 is opened, that is when the control valve 57 has been moved to a fully closed position, the compressor motor will be stopped.

Under some circumstances it is desirable to bleed high pressure refrigerant from the high pressure line into the equalizer connections. In order to do this, a metering device 107 may be provided, this device comprising a casing 108 having an inlet chamber 109 therein to which high pressure refrigerant may be bled through a pipe 110 connected to the discharge pipe 29 leading from the condenser. Within the chamber 109 is disposed a metering orifice member 111 having a metering orifice extending therethrough. The casing 108 has an outlet 112 to which a pipe 113 is connected, the pipe 113 having a manual valve 114 therein and being connected to the pipe 55. When the manual valve 114 is open, refrigerant may be communicated from the pipe 29 through the pipe 110, the metering orifice member 111 and through the manual valve into the equalizer connections. When the manual valve 114 is closed, the metering device 107 of course has no function. The operation and purposes of the metering device 107 will be described more completely hereinafter.

Each of the expansion valves 28 may be operated in the manner of superheat control expansion valves well known in the art. The operation of the expansion valves of this type in systems employing only a single evaporator rather than multiple evaporators is described in detail in my prior applications referred to above. Briefly, however, referring to the expansion valve 28 with hand valve 114 closed, it operates to maintain a given degree of superheat at the outlet of the evaporator 20 inasmuch as it is adjusted in response to the temperature of superheated refrigerant at the outlet of the evaporator and the pressure at the outlet of the evaporator so as to maintain a constant difference between the latter pressure and pressure corresponding to the superheat temperature. With the control valve 57 in a wide open position, the chamber 38 is in open communication with the common outlet of the evaporators so that the pressure existing therein is free to act on the diaphragm 40 to urge the valve head 39 towards its seat, the refrigerant leaking past packing 45 having negligible effect on the pressure in chamber 38. Thus when the pressure in the outlet of the evaporators tends to rise, the expansion valve 28 tends to close and when the degree of superheat at the outlet of the evaporator 20 rises the increased pressure developed within the bulb 50 acts directly on the diaphragm 40 tending to move the valve in opening direction. The valves 28a and 28b operate in the same manner as the valve 28. The degree of superheat maintained by each of the valves 28 may be varied by varying the pressure effective underneath the diaphragms of the valves. In my system, this is accomplished by providing restriction in the equalizer connection by means of the control valve 57. This operation has also been described in detail in my prior applications, particularly my prior application Serial No. 286,594, filed July 26, 1939.

As the temperature affecting the controller 78 falls as described above, the control valve 57 moves in closing direction tending to restrict communication through the equalizer connections, that is through the passages 55 and 58. As the equalizer connection becomes more and more restricted, the chambers underneath the diaphragms of the respective valve become less and less subject to the lower pressure existing at the common outlet of the evaporators. Thus the pressure in the inlet of the evaporators which bleeds into the chambers underneath the diaphragms around the valve stems becomes more and more effective, tending to accumulate underneath the diaphragms so as to urge the valves more and more in closing direction. Thus as the control valve 57 moves in closing direction in response to fall in temperature the expansion valves move to closed position so as to restrict the admission of refrigerant to the evaporators so that a higher degree of superheat is maintained at their outlets. In other words, the capacity of the various evaporators is reduced as the temperature affecting the controller 78 falls. When the temperature affecting the controller 78 rises, the control valve 57 is of course moved in the opposite direction and the effect is to decrease the degree of superheat maintained in the outlet of each evaporator.

When the temperature in the spaces being conditioned has fallen to substantially 75°, the control valve 57 reaches closed position, the mercury switch 73 is closed and switch 75 is opened. Under these circumstances, the equalizer connections are cut off from the common outlet of the evaporators and the valve 91 is energized and opened. Also, the circuit to the compressor motor is interrupted so as to stop the compressor motor. Opening of the valve 91 admits high pressure refrigerant from pipe 29 to the pipe 90, pipe 55 and its branches underneath the diaphragms of the various valves for closing the valves. Thus when the valve 57 closes, this occurring at a time when no refrigeration is required, the expansion valves are fully closed so as to entirely cut off the admission of refrigerant to the evaporators and the compressor is shut down.

When high pressure refrigerant is admitted to the chambers underneath the diaphragms, rupture of the diaphragms from excessive pressure is prevented because the pressure can bleed to the inlet of the evaporators around the valve stems.

While it is a part of my invention to control the superheat maintained at the outlet of a plurality of multiple evaporators by means of a single control valve in the equalizer connection, my invention also comprehends sequentially controlling the capacities of the various evaporators so that as the load diminishes the capacities of the evaporators are sequentially reduced, that is the refrigerating effect of the evaporators is reduced to a minimum amount in one evaporator at a time. During normal operation of the system of my invention, the expansion valves 28 are adjusted to maintain relatively different degrees of superheat at the outlets of their respective evaporators. This may be effected by utilizing springs 47 having different characteristics urging the valves in closing direction. Thus the spring 47 of valve 28 may have such characteristics that when the valve 57 is in a given position the valve 28 maintains a predetermined degree of superheat at the outlet of the evaporator 20 which may be 10°, for example. The springs of the valves 28a and 28b have such characteristics that under the same conditions, that is with the valve 57 in the same position, the valve 28a will maintain 20° superheat at the outlet of the evaporator 20a and the valve 28b will maintain 30° of superheat at the outlet of the evaporator 20b. By reason of normally maintaining this degree of superheat at the outlets of the various evaporators, I am able to sequentially control the capacities of the evaporators by means of the control valve 57.

Figure 2:
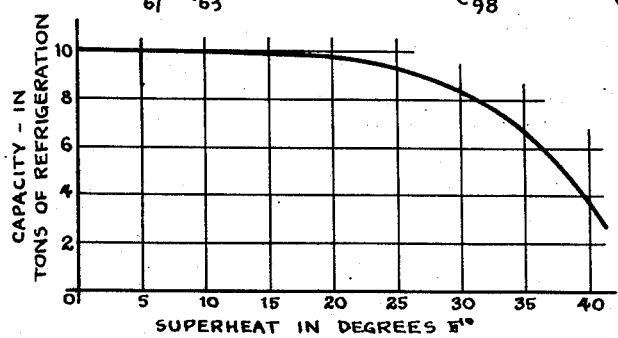
Figure 2 is a graph having a curve showing the relationship between refrigerating capacity and superheat for a typical evaporator coil.

Referring now to the graph of Figure 2, this graph represents the refrigerating capacity of each coil in tons of refrigeration at different degrees of superheat. Thus with reference to evaporator 20, if 10 degrees of superheat are being maintained at the outlet, its capacity is 10 as shown on the graph. If at the same time, as described above, 20 degrees of superheat are being maintained at the outlet of the evaporator 20a, its capacity is practically 10 as shown on the graph. Also, if 30 degrees of superheat are being maintained at the same time at the outlet of 20b, its capacity is slightly more than 8 as shown on the graph. In other words, with the degrees of superheat just mentioned being maintained at the outlets of the evaporators, their capacities are all almost maximum. By inspecting the curve of Figure 2, it will be seen that at superheats up to 25° approximately increases in superheat do not have very much effect on the capacity. For example, looking at the curve, by increasing the superheat from 10 to 20 it is to be seen that the capacity drops off only a negligible amount. However, at superheats above 20 or 25 degrees the curve slopes downwardly considerably and if the superheat is increased when it is above these values the capacity of the coil drops off rapidly. In other words, if 30 degrees of superheat is being maintained at the outlet of a coil and this degree of superheat is increased to 40, by inspecting the graph it can be seen that the capacity of that coil would drop off from a little more than 8 to 4 tons of refrigeration. Thus by increasing the degree of superheat when it is at a value above 30, for example, the capacity of the coil is soon reduced to a negligible amount.

By reason of the characteristics of the capacity curve of Figure 2, the capacities of the various evaporators can be sequentially controlled by means of the control valve 57. Thus assuming the exemplary conditions mentioned above exist, that is, that the control valve 57 is in a given position and the springs of the various expansion valves have such characteristics that with the valve 57 in the said position 10 degrees of superheat are being maintained at the outlet of evaporator 20, twenty degrees at the outlet of evaporator 20a and 30 degrees at the outlet of evaporator 20b, then if the temperature affecting controller 78 falls an amount sufficient to cause valve 57 to close enough to increase the superheat at the outlet of each evaporator by 10 degrees, it will be seen that the superheat at the outlet of the evaporator 20 may then be 20 degrees, the superheat at the outlet of the evaporator 20a may be 30 degrees and the superheat at the outlet of the evaporator 20b may be 40 degrees. By inspecting the curve of Figure 2, it will be seen therefore that the capacity of the evaporator 20 has been reduced only negligibly, the capacity of evaporator 20a has been only slightly reduced but the capacity of evaporator 20b has been greatly reduced. Obviously, a further increase in the superheats maintained at the outlets of all the evaporators would quickly reduce the capacity of the evaporator 20b to a negligible amount and further increases in the degrees of superheats maintained at the outlets of the evaporators would then reduce the capacity of the evaporator 20a to a negligible amount and last the capacity of evaporator 20 would be reduced. Therefore it is to be seen that with arrangement I have provided wherein different degrees of superheat are maintained by the various expansion valves, the capacities of the evaporators are sequentially reduced when the control valve 57 closes in response to the controller 78. When the temperature in the spaces being conditioned is approaching the desired value, maximum refrigeration by all of the evaporators is of course no longer required.

Evaporator 20b may be the last one to be cut off i the sequence and this evaporator, which then remains cold longest, is more directly in the path of fresh air from branch duct 23. This is a feature of my invention.

From the foregoing, it will be understood that when the control valve 57 is moved to closed position there is no further need for refrigeration by the evaporators and the expansion valves are all in closed position so that there is no load on the refrigerating apparatus, and that under these circumstances the compressor is shut down by the mercury switch 75.

With the structure so far described, the capacities of the various evaporators may be varied gradually a substantial amount by varying the pressure which is effective underneath the diaphragms by means of the control valve 57. Under some circumstances, however, where there is a relatively small pressure drop through the evaporators the pressure at the inlet of the evaporators may not be sufficient when acting on the lower side of the diaphragms to modulate the valves to a position near enough to closed position. Under these circumstances, it is desired that a higher pressure be available for use in the chambers beneath the diaphragms of the various valves. To provide this higher pressure the metering device 107 may be used. Thus when it is desired to use the device 107, the manual valve 114 is open providing restricted communication between the pipe 29 and the pipe 55. In other words, with the manual valve 114 open high pressure refrigerant from the pipe 29 is bled into the equalizer connection through the pipe 110, the metering orifice and the manual valve 114. When high pressure refrigerant is bled into the equalizer connection in this manner, the pressure in the said connection is still controlled by the control valve 57 inasmuch as the valve 57 always controls the flow from the pipe 55 to the pipe 58 and to the suction line of the compressor. The arrangement just described is disclosed in detail in my prior application referred to above Serial No. 286,594, filed July 26, 1939.

If desired, substantially the same results as are secured by the use of the metering device 107 may be secured by reversing the connections to the expansion valves 28. Thus referring to valve 28, the branch pipe 31 may be connected to the throat 37 and the inlet of the evaporator may be connected to the chamber 36. It would be possible therefore for high pressure refrigerant from the pipe 30 to leak past the packing 45 around the valve stem 47 into the chamber 38 providing a restricted bleed of high pressure refrigerant into the equalizer connection substantially as provided by the metering device 107. It would be possible of course for high pressure refrigerant to thus leak into the chamber underneath the diaphragm of each of the expansion valves provided the connections to each valve were reversed as described. Whenever arrangements are provided for bleeding high pressure refrigerant into the chambers underneath the diaphragms, when the equalizer connection is closed, the high pressure refrigerant will fully close the expansion valves.

Referring to Figure 3 of the drawings, I have shown a modified form of my invention utilizing a different form of expansion valve of a pressure operated type, the expansion valves being controlled by pilot valves responsive to superheat. The system of Figure 3 utilizes the same compressor and condenser and compressor motor control as Figure 1, these elements not being shown in Figure 3. In Figure 3, as in Figure 1, numeral 29 designates the discharge pipe from the condenser and numeral 15 designates the suction pipe connected to the suction side of the compressor. Like numerals designate like elements in the different figures throughout. Structure like that of Figure 3 embodying only a single evaporator is disclosed in my prior application Serial No. 300,400, filed October 20, 1939.

The discharge pipe 29 from the condenser is connected to a pipe 300 having branch pipes 301, 301a and 301b connected to the inlets of expansion valves 302, 302a and 302b, respectively. The outlet of the expansion valve 302 is connected to an evaporator coil 303 by a pipe 304. The outlet of the expansion valve 302a is connected to an evaporator coil 303a by a pipe 304a. The outlet of the expansion valve 302o is connected by an evaporator coil 303b by a pipe 304b. The outlet of the evaporator coil 303 is connected to the compressor suction pipe 15 by a pipe 305 having a portion 306 shown enlarged. The outlet of the evaporator coil 303a is connected to the compressor suction pipe 15 by a pipe 305a having a portion 306a shown enlarged. The outlet of the evaporator coil 303b is connected to a suction pipe 15 by a pipe 305b having a portion 306b shown enlarged.

The expansion valve 302 comprises a casing 310 which is generally cylindrical and the lower part of which is closed by a plate 311 there being a gasket 312 interposed between the plate 311 and the lower portions of the casing 310 to make the interior of the casing fluid tight. Numeral 313 designates a nipple member which engages a central portion of the plate 311 in screw-threaded relationship. The portion of the nipple member 313 within the casing 310 is of slightly larger diameter and this portion of the nipple has an angular groove or recess 314. The nipple 313 has a longitudinal orifice 315 therein and communication is provided between this orifice and the groove 314 by a transverse orifice or channel 316. Numeral 317 designates a pressure responsive cell formed by two complementary diaphragms 318 and 319 secured together at their edges. Within the cell 317 is a circular disk 320 of suitable thickness to prevent complete collapse of the cell 317 to avoid rupture of the diaphragms. Interposed between the disk 320 and the upper diaphragm 318 is a spring member 321 in the form of a spider having a plurality of fingers which normally urges the cell into expanded position. The upper diaphragm 318 carries a disk 322 having a stud to which is secured a valve head 323. The valve head cooperates with a removable seat member 324 engaging the upper part of the casing 310 in screw-threaded relationship. The longitudinal orifice 315 communicates with a co-axial orifice in the lower diaphragm 319 and in the disk 320 so that the orifice 315 communicates with the interior of the cell 317. Numeral 325 designates a ring shaped screen member disposed within the casing 310 so that refrigerant entering the inlet of the casing 310 must pass through the screen so as to filter it before it can reach the interior of the casing around the cell 317.

Numeral 330 designates a cap engaging the outer end of the nipple 313 in screw-threaded relationship. The interior of the cap 330 is connected to a pilot valve generally designated at 331 by a pipe 332. The outlet of the pilot valve 331 is connected to a pipe 333 by a branch pipe 334. The pipe 333 is connected to a temperature responsive control valve 57 which is the same as the control valve 57 of the previous embodiment and the outlet of the valve 57 is connected to the compressor suction pipe 15 by a pipe 58 as in the previous embodiment. The control valve 57 is controlled by a proportioning controller 78 as in Figure 1. The proportioning motor 70 operates a mercury switch 75 by a cam 72 the same as shown in Figure 1, the mercury switch 75 controlling a compressor motor as described in connection with Figure 1.

From the foregoing it can be seen that the expansion valve 302 is controlled by a pressure within the cell 317, the cell 317 expanding and contracting moving the valve head 323 toward and away from its seat in accordance with the pressure developed within the cell. High pressure refrigerant entering the casing 310 passes through the groove 314 and is metered through the orifices 316 and 315 to the interior of the cell 317. The refrigerant which is thus metered into the interior of the cell 317 is bled off through the orifice 315, the pipe 332, valve 331, pipe 333, control valve 57 and pipe 58 to the suction pipe 15 leading to the compressor. The pressure developed within the cell 317 therefore depends upon the rate at which refrigerant is held off from the interior thereof and this rate always depends upon the position of the valves 311 and 57 which act as pilot valves.

The valves 302a and 302b are identical with the valve 302 and therefore they need not be further described. Each of the valves 302a and 302b have corresponding bleed connections from the interiors of their respective cells to the suction line 15 connected to the compressor. Each of the valves 302a and 302b also has a superheat responsive valve in its respective bleed connection corresponding to the valve 331 and identical therewith in construction. The bleed pipes and superheat control valves associated with the expansion valves 302a and 302b are designated by the same numerals as the corresponding elements associated with valve 302 with distinguishing characteristics a and b. A further description thereof is not necessary.

The superheat responsive pilot valve 331 comprises a tube 340, one end of which is closed by an end plug 341. In screw-threaded relationship with the end plug 341 is a manually adjustable screw 342 near the inner end of which is a shoulder 343. Interposed between the shoulder 343 and the end plug 341 is a fibrous washer 344 to prevent the escape of refrigerant from within the tube 340 around the screw 342. The inner end of the screw 342 is slotted so as to receive the end of a helical bimetal element 345. The opposite end of the element 345 is secured to the end of a pin 346 which extends through a disk 347 in the end of the tube 340. Numeral 348 designates a similar tube of slightly smaller diameter telescoped within the tube 340, its end being disposed in abutting relationship with the disk 347. The left-hand end of the tube 348 is closed by an end plug 349 having a bore 350 to which the pipe 332 is connected, and a counterbore 351. Within the tube 348 is a second helical bimetal element 352, the right end of which is secured to the pin 346 and the left end of which is secured in a slot in a screw-threaded plug 353 which engaged the counter-bore 351 in screw-threaded relationship. The plug 353 carries a valve head 354 which cooperates with a seat formed by the end of the bore 350. The plug 353 has a longitudinal groove 355 to permit refrigerant which enters through the bore 350 to pass the plug to the interior of the tube 348. The plug 349 also has a bore 356 communicating with the interior of the tube 348 and to which the branch pipe 334 is connected.

The tube 340 which is of slightly larger diameter than the tube 348 is secured to the outlet pipe of the evaporator 303, that is the portion 306 which is shown enlarged, by a metal strip 360 or other suitable clamping means. There is intimate thermal contact between the pipe portion 306 and the tube 340 so that the bimetal element 345 is responsive to the temperature of superheated refrigerant within the outlet pipe of the evaporator 303. The bimetal element 352 is responsive to the temperature of the refrigerant which is admitted to the tube 348. From the foregoing it can be seen that refrigerant which is metered to the interior of the cell 317 is communicated through the orifice 315 and pipe 332 to the interior of the tube 348. The valve head 354 is slightly scored so that at least a small amount of refrigerant may always pass the valve head so as to enter the interior of the tube 348. When the control valve 57 is wide open, the interior of the tube 348 is in communication with the common outlet pipes of the evaporators and the pipe 15 leading to the suction side of the compressor. The pressure within the tube 348 is therefore substantially the same as that in the outlets of the evaporators and the suction line leading to the compressor. The refrigerant within the tube 348 vaporizes at a vaporization temperature corresponding to the pressure existing within the common outlets of the evaporators and the bimetal element 352 is therefore responsive to a temperature which corresponds to the pressure existing in the outlets of the evaporators. The two bimetal elements 352 and 345 act in opposition. That is, the bimetal element 352 acts to move the valve head 354 towards its seat so as to restrict the bleed from within the cell 317 in response to a rise in temperature. The bimetal element 345 which is responsive to the temperature of the superheated refrigerant in the outlet of the evaporator 303 acts to move the valve head 354 away from its seat in response to a rise in temperature and thus to permit a greater rate of bleed from within the cell 317. When the bleed through the bleed circuit is restricted, the pressure within the cell 317 tends to rise so as to expand the cell tending to close the valve 302 and when the rate of bleed through the bleed circuit is increased the pressure within the cell 317 diminishes tending to cause the valve 302 to open to a wider position. From the foregoing it can readily be seen that the valve 331 tends to maintain a constant difference between the temperature of superheated refrigerant and the temperature corresponding to the pressure in the outlets of the evaporators. In other words, the valve 331 tends to maintain a constant degree of superheat at the outlet of the evaporator 303 by adjusting the expansion valve 302 to maintain this degree of superheat. The degree of superheat to be maintained by the valve 331 can readily be manually adjusted by adjusting the screw 342 to adjust the position of the bimetal elements and the valve head 354 with respect to its seat.

The expansion valves 302a and 302b are controlled in exactly the same manner as the valve 302 by their associated superheat responsive pilot valves.

From the foregoing it is to be noted that the bleed circuits of the respective expansion valves extend through their individual superheat responsive pilot valves and are then connected in common to the pipe 333 which is connected to the control valve 57. Control valve 57 therefore controls the rate of bleed from the respective cells of all of the expansion valves. Normally therefore, a given degree of superheat is maintained at the outlet of each of the evaporators and the superheat at the outlets of all of the evaporators may be simultaneously adjusted by operation of the control valve 57 corresponding to the operation of the previous embodiment. Similarly to the previous embodiment, the superheat control valves 331 are adjusted so as to maintain relatively different degrees of superheat at the outlets of their respective evaporators. The valves 331 may be adjusted to maintain these different degrees of superheat by adjusting the screws 342 as described above. Thus as in the previous embodiment, with different degrees of superheat being maintained at the outlets of the respective evaporators when the degree of superheat at the outlet of all of them is increased when the valve 57 is moved towards closed position, the capacities of the evaporators having higher degrees of superheat will be reduced most and the refrigerating effect of the evaporator operating at the highest degree of superheat will be reduced to a negligible amount first. The embodiment of Figure 3 therefore produces the same ultimate result as described in connection with Figure 1 by utilizing main expansion valves of a pressure operated type controlled by individual pilot valves. The embodiment of Figure 3 has advantages similar to those pointed out in connection with the embodiment of Figure 1.

The embodiments of my invention which I have disclosed are representative of forms which it may take and of modifications and variations which may be made in it. Many variations and changes will occur to those skilled in the art but which fall within the spirit and scope of the invention. The invention is therefore not to be limited by the disclosure which is exemplary but only in accordance with the appended claims.

I claim as my invention:

1. In a refrigerating system, in combination, a plurality of evaporators, a source of refrigerant supply for said evaporators, means associated with each evaporator for maintaining a given degree of superheat at the outlet thereof, said last means being adjusted to maintain a substantially different degree of superheat at the outlet of each evaporator, and control means cooperable with said first means and operative to simultaneously vary the degree of superheat maintained at the outlet of each evaporator by said first means, whereby when the degrees of superheat maintained at the outlets of the evaporators are simultaneously increased the capacities of the evaporators operating at higher superheat settings are reduced most.

2. In a refrigerating system, in combination, a plurality of evaporators, a source of refrigerant supply for said evaporators, automatic valve means of the constant superheat control type associated with each evaporator for controlling the supply of refrigerant thereto, said valve means being constructed and arranged to maintain a substantially different degree of superheat at the outlet of each evaporator, and control means whereby the degrees of superheat maintained at the outlets of the evaporators may be simultaneously adjusted whereby when the degrees of superheat are increased the capacities of the evaporators operating at higher superheat are reduced more than those operating at relatively lower superheat.

3. In a refrigerating system, in combination, a plurality of evaporators having individual outlets connected to a common outlet, a source of refrigerant supply for said evaporators, valve means of the superheat control type associated with each evaporator for controlling the supply of refrigerant thereto, each valve means having a pressure chamber and means connecting each chamber with the outlet of said evaporators, said valve means embodying structural arrangements whereby each individual valve maintains a substantially different degree of superheat at the outlet of its evaporator, and means for controlling the pressure communicated through all of said connecting means for simultaneously varying the superheat maintained by each valve means so that when the degrees of superheat maintained at the outlets of evaporators are simultaneously increased the capacities of the evaporators operating at higher superheats are reduced a relatively greater amount.

4. In a refrigerating system, in combination, a plurality of evaporators, a source of refrigerant supply for said evaporators, valve means of the superheat control type associated with each evaporator for controlling the supply of refrigerant thereto, each valve means having a pressure chamber, means connecting the chambers with the outlets of said evaporators, said valve means embodying structural arrangements whereby each valve maintains a substantially different degree of superheat at the outlet of its evaporator, means providing relatively restricted communication between said source of refrigerant supply and said connecting means, and means for controlling the pressure communicated to all said chambers for simultaneously varying the superheats maintained by each valve means, whereby when the superheats are increased the capacities of the evaporators operating at higher superheats are reduced more than the capacities of those operating at lower superheats.

5. In a refrigerating system, in combination, a plurality of evaporators having individual outlets connected to a common outlet, a source of refrigerant for said evaporators, a pressure operated expansion valve having a pressure chamber controlling the supply of refrigerant to each evaporator, connections providing communication between said source of refrigerant, said chambers and said outlet, a superheat control type valve associated with each evaporator and said connections for controlling the pressure in the pressure chamber of its associated expansion valve so as to control the superheat at the outlet of its respective evaporator, means associated with said connections for controlling the pressures in all said chambers for simultaneously adjusting said expansion valves to vary the rate of admission of refrigerant to said evaporators.

6. In a refrigerating system, in combination, a plurality of evaporators having individual outlets connected to a common outlet, a source of refrigerant for said evaporators, a pressure operated expansion valve having a pressure chamber controlling the supply of refrigerant to each evaporator, connections providing communication between said source of refrigerant, said chambers and said outlet, a superheat control type valve associated with each evaporator and said connections for controlling the pressure in the pressure chamber of its associated expansion valve so as to control the superheat at the outlet of its respective evaporator, means for adjusting the degree of superheat to be maintained by each superheat control valve, said control valves being adjusted to maintain substantially different degrees of superheat in their respective evaporators, means associated with said connections for controlling the pressures in all said chambers for adjusting said expansion valves so as to simultaneously vary the degrees of superheat maintained at the outlets of their respective evaporators, whereby when the superheats of all the evaporators are simultaneously increased the capacities of the evaporators operating at higher superheats are reduced by a relatively greater amount.

7. In a refrigerating system, in combination, a plurality of evaporators having a common outlet, a source of refrigerant supply for said evaporators, valve means of the superheat control type associated with each evaporator for controlling the supply of refrigerant thereto, each valve means having a pressure chamber and means connecting each chamber with the outlet of said evaporators, means for controlling the pressure communicated through all of said connecting means for simultaneously varying the superheat maintained by each of said valve means, and means for conveying refrigerant from said source to said chambers for moving said valve means to closed position.

8. In a refrigerating system, in combination, a plurality of evaporators having individual outlets connected to a common outlet, a source of refrigerant supply for said evaporators, valve means of the superheat control type associated with each evaporator for controlling the supply of refrigerant thereto, each valve means having a pressure chamber and means connecting each chamber with the outlet of said evaporators, said valve means embodying structural arrangements whereby individual valves maintain substantially different degrees of superheat at the outlets of their respective evaporators, means for controlling the pressure communicated through all of said connecting means for simultaneously varying the superheat maintained by each valve means so that when the degrees of superheat maintained at the outlets of evaporators are simultaneously increased the capacities of the evaporators operating at higher superheats are reduced a relatively greater amount, and means for conveying refrigerant from said source to said chambers for moving said valve means to closed position.

9. In a refrigerating system, in combination, a plurality of evaporators having a common outlet, a source of refrigerant supply for said evaporators, valve means of the superheat control type associated with each evaporator for controlling the supply of refrigerant thereto, each valve means having a pressure chamber, means connecting the chambers with the outlet of said evaporators, means providing relatively restricted communication between said source of refrigerant supply and said connecting means, means for controlling the pressure affecting all said chambers for simultaneously varying the superheats maintained by each of said valve means, and means providing relatively unrestricted communication of refrigerant from said source to said chambers for moving said valve means to closed position.

10. In a refrigerating system, in combination, a plurality of evaporators having individual outlets connected to a common outlet, a source of refrigerant supply for said evaporators, valve means of the superheat control type associated with each evaporator for controlling the supply of refrigerant thereto, each valve means having a pressure chamber and means connecting each chamber with the outlet of said evaporators, said valve means embodying structural arrangements whereby individual valves maintain relatively different degrees of superheat at the outlets of their respective evaporators, means providing relatively restricted communication between said source of refrigerant supply and said connecting means, means for controlling the pressure communicated to all said chambers for simultaneously varying the superheats maintained by each valve means, whereby when the superheats are increased the capacities of the evaporators operating at higher superheats are reduced more than the capacities of those operating at lower superheats, and means capable of providing relatively unrestricted communication of refrigerant from said source to said chambers for moving said valve means to closed position.

11. In a refrigerating system, in combination, a plurality of evaporators having a common outlet, a source of refrigerant supply for said evaporators, valve means of the superheat control type associated with each evaporator for controlling the supply of refrigerant thereto, each valve means having a pressure chamber and means connecting each chamber with the outlet of said evaporators, means providing relatively restricted communication between the inlet of each evaporator and its respective pressure chamber, and means for simultaneously controlling the pressure affecting all said chambers for varying the superheats maintained by each of said valve means.

12. In a refrigerating system, in combination, a plurality of evaporators having a common outlet, a source of refrigerant supply for said evaporators, valve means of the superheat control type associated with each evaporator for controlling the supply of refrigerant thereto, each valve means having a pressure chamber and means connecting each chamber with the outlet of said evaporators, means providing relatively restricted communication between the inlet of each evaporator and its respective pressure chamber, means for controlling the pressure affecting all said chambers for simultaneously varying the superheats maintained by each of said valve means, and means for conveying refrigerant from said source to said chambers for closing said valves.

13. In a refrigeration system, in combination, evaporator means having inlet means and outlet means, a source of refrigerant supply for said evaporator means, a plurality of expansion valves of the superheat control type associated with said evaporator means for controlling the supply of refrigerant thereto, each valve means having a pressure chamber, means connecting each chamber with the outlet of said evaporator means, means providing communication between the inlet of said evaporator means and said pressure chambers, and means for controlling the pressure affecting all of said chambers for simultaneously varying the superheat maintained by each of said valve means.

14. In a refrigeration system, in combination, evaporator means having inlet means and outlet means, a source of refrigerant supply for said evaporator means, a plurality of automatic valve means of the constant superheat control type associated with said evaporator means for controlling the supply of refrigerant thereto, said valve means being constructed and arranged to operate at substantially different degrees of superheat, and control means whereby the degrees of superheat to which said valves respond may be simultaneously adjusted whereby, when the degrees of superheat are increased, the capacities of the valves operating at higher superheat are reduced more than those operating at relatively lower superheat.

15. In a refrigerating system, in combination, a plurality of evaporators having a common outlet, a source of refrigerant supply for said evaporators, automatic valve means of the constant superheat control type associated with each evaporator for controlling the supply of refrigerant thereto, each valve means having a pressure chamber, means common to all of said valve means for connecting each chamber with the outlet of said evaporators, conduit means providing relatively restricted communication between said source of refrigerant supply and said connecting means, and means in flow controlling association with said connecting means for controlling the pressure affecting all of said chambers for simultaneously varying the superheats maintained by each of said valve means.

ALWIN B. NEWTON.